(No Model.)
W. N. STROUD.
WHEEL.
No. 401,080. Patented Apr. 9, 1889.
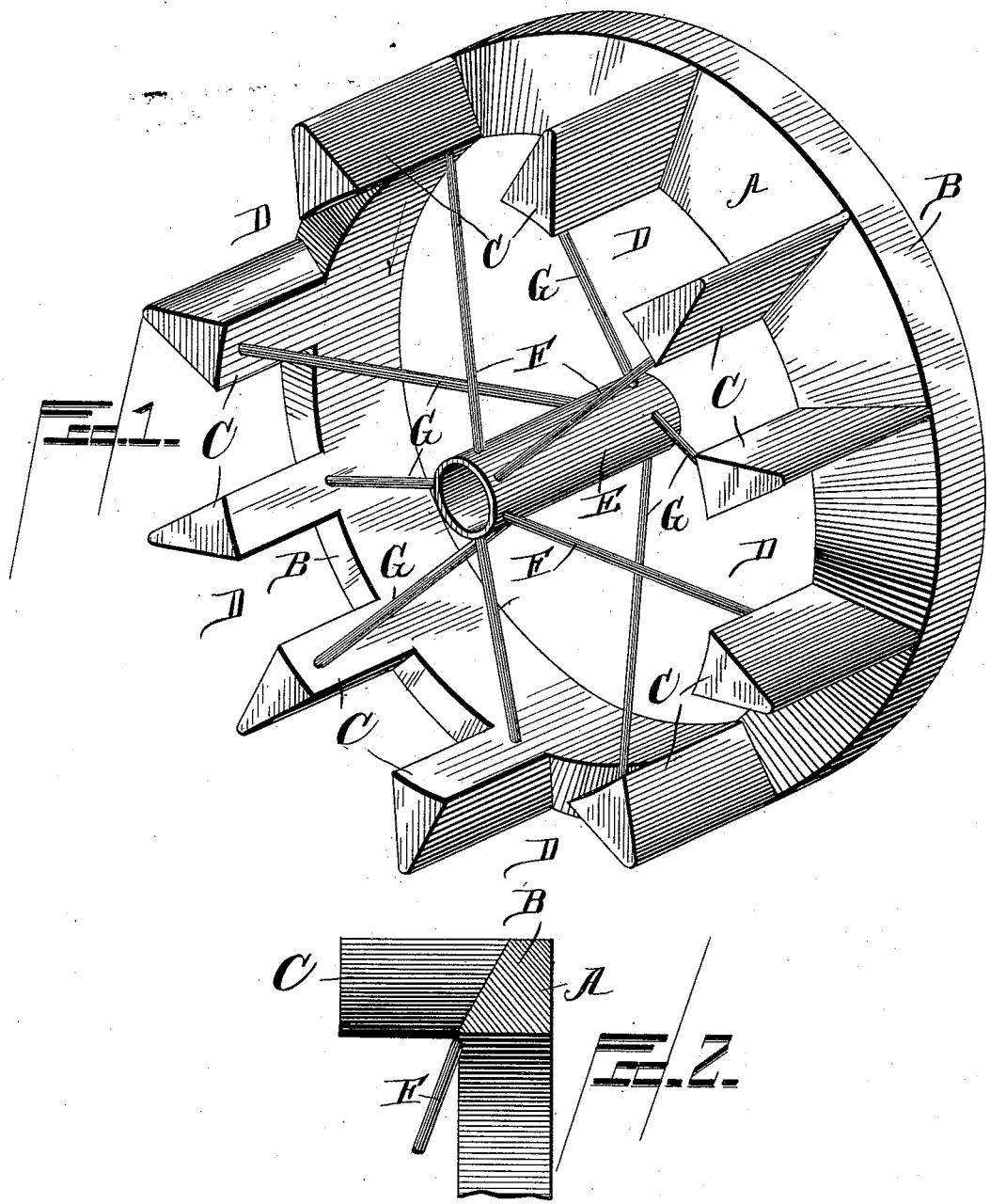
WITNESSES
Henry G. Dieterich
C. E. Doyle
INVENTOR,
Wiley N. Stroud,
By C. A. Snow & Co.
his Attorneys

UNITED STATES PATENT OFFICE.

WILEY N. STROUD, OF WAXAHACHIE, TEXAS.

WHEEL.

SPECIFICATION forming part of Letters Patent No. 401,080, dated April 9, 1889.

Application filed December 11, 1888. Serial No. 293,234. (No model.)

*To all whom it may concern:*

Be it known that I, WILEY N. STROUD, a citizen of the United States, residing at Waxahachie, in the county of Ellis and State of Texas, have invented new and useful Improvements in Wheels, of which the following is a specification.

The invention relates to improvements in wheels adapted for use on harvesters and similar devices; and it consists in a certain novel construction and combination of devices, fully set forth hereinafter in connection with the accompanying drawings, and specifically pointed out in the appended claims.

In the drawings, Figure 1 is a perspective view of a wheel embodying my improvements. Fig. 2 is a detail transverse section through the rim.

Referring by letter to the drawings, A designates the rim of the improved wheel, which is provided with a peripheral rib, B, having a vertical outer side and an inclined inner side, and C C designate lateral independent wedge-shaped ears or projections, the outer reduced edges of which are flush with the outer reduced periphery of the rib B. The extremities of the said ears or projections are unconnected, thereby leaving open spaces D D therebetween, for a purpose to be hereinafter explained.

E designates the hub of the wheel, which extends from the outer side of the rib B to the inner extremities of the ears or projections.

F F designate the inner spokes, which are attached at their adjacent ends to the inner end of the hub and at their outer or remote ends to the rim A, respectively, at the outer ends of the ears or projections—namely, the ends which are attached to the rim of the wheel—and G G designate the outer spokes, which are attached at their adjacent or inner ends to the outer end of the hub, and at their outer or remote ends to the inner or free ends of the said ears or projections.

From the above it will be seen that the inner spokes are inclined outwardly, and the outer spokes are inclined inwardly toward their remote ends, whereby compression of the rim of the wheel is transformed into lateral thrusts on the hub, and the lateral thrusts counterbalance each other.

Having described my invention, I claim—

1. In a wheel for the purpose named, the combination of the rim provided with a peripheral outwardly-tapered rib, B, and the lateral independent wedge-shaped ears or projections arranged on the side of the said rib with their outer edges flush with the outer edge of the rib, substantially as specified.

2. In a wheel for the purpose named, the combination of the rim provided with a tapered peripheral rib having laterally-extending wedge-shaped ears or projections C C, the hub, and the outer and inner series of spokes extending from the hub, respectively, to opposite ends of the said ears or projections, substantially as specified.

3. In a wheel for the purpose named, the combination, with the rim provided with laterally-extending independent ears or projections, of the hub and the outer and inner series of spokes, F and G, inclined in opposite directions and attached at their outer ends to alternate ears or projections, substantially as specified.

In testimony that I claim the foregoing as my own I have hereto affixed my signature in presence of two witnesses.

WILEY N. STROUD.

Witnesses:
T. J. SPEER,
J. J. THANEUR.